United States Patent
Furuichi

(10) Patent No.: US 10,602,369 B2
(45) Date of Patent: Mar. 24, 2020

(54) COMMUNICATION CONTROL DEVICE, COMMUNICATION CONTROL DETERMINATION DEVICE, AND METHOD

(71) Applicant: SONY CORPORATION, Tokyo (JP)

(72) Inventor: Sho Furuichi, Tokyo (JP)

(73) Assignee: SONY CORPORATION, Tokyo (JP)

(*) Notice: Subject to any disclaimer, the term of this patent is extended or adjusted under 35 U.S.C. 154(b) by 97 days.

(21) Appl. No.: 15/757,406

(22) PCT Filed: Aug. 16, 2016

(86) PCT No.: PCT/JP2016/073900
§ 371 (c)(1),
(2) Date: Mar. 5, 2018

(87) PCT Pub. No.: WO2017/043265
PCT Pub. Date: Mar. 16, 2017

(65) Prior Publication Data
US 2018/0262914 A1    Sep. 13, 2018

(30) Foreign Application Priority Data
Sep. 11, 2015    (JP) .................. 2015-179403

(51) Int. Cl.
*H04W 4/00* (2018.01)
*H04W 16/14* (2009.01)
(Continued)

(52) U.S. Cl.
CPC .......... *H04W 16/14* (2013.01); *H04W 48/18* (2013.01); *H04W 76/14* (2018.02); *H04W 4/025* (2013.01); *H04W 48/08* (2013.01); *H04W 48/16* (2013.01)

(58) Field of Classification Search
None
See application file for complete search history.

(56) References Cited

U.S. PATENT DOCUMENTS 6,188,897 B1   2/2001   Nelson
2008/0285513 A1*   11/2008   Jung .................. H04W 72/042
                                                                  370/329
(Continued)

FOREIGN PATENT DOCUMENTS

EP    2 521 392 A1    11/2012
EP    2 693 790 A1    2/2014
(Continued)

OTHER PUBLICATIONS

Extended European Search Report dated Jan. 9, 2019 in European Application No. 16844128.5-1214.
(Continued)

*Primary Examiner* — Bob A Phunkulh
(74) *Attorney, Agent, or Firm* — Xsensus LLP

(57) ABSTRACT

[Object] To provide a communication control device capable of smoothly exchanging information between a plurality of wireless systems.
[Solution] Provided is a communication control device including: a communication unit configured to transmit geographical location information of the own device or a communication node served by the own device to a communication control determination device that controls coexistence of a plurality of wireless systems; and an acquisition unit configured to acquire, from the communication control determination device, information including information necessary for communication control for coexistence as information regarding another communication control determination device that manages a peripheral region of a geographical region managed by the communication control determination device.

7 Claims, 10 Drawing Sheets

(51) Int. Cl.
- *H04W 48/18* (2009.01)
- *H04W 76/14* (2018.01)
- *H04W 4/02* (2018.01)
- *H04W 48/08* (2009.01)
- *H04W 48/16* (2009.01)

(56) References Cited

U.S. PATENT DOCUMENTS

| | | | | |
|---|---|---|---|---|
| 2012/0106364 A1* | 5/2012 | Kasslin | ................ | H04W 16/14 370/252 |
| 2012/0106461 A1* | 5/2012 | Kasslin | ................ | H04W 16/14 370/329 |
| 2012/0182883 A1 | 7/2012 | Junell et al. | | |
| 2012/0195270 A1* | 8/2012 | Kang | ................ | H04W 16/14 370/329 |
| 2012/0201209 A1* | 8/2012 | Lee | ................ | H04L 12/2865 370/329 |
| 2012/0304213 A1* | 11/2012 | Lee | ................ | H04W 16/14 725/14 |
| 2013/0051279 A1* | 2/2013 | Lee | ................ | H04W 16/14 370/254 |
| 2013/0054723 A1* | 2/2013 | Jo | ................ | H04W 24/00 709/206 |
| 2013/0059588 A1* | 3/2013 | Jo | ................ | H04W 16/14 455/436 |
| 2013/0157706 A1* | 6/2013 | Jo | ................ | H04W 16/14 455/512 |
| 2013/0165136 A1* | 6/2013 | Kang | ................ | H04W 16/14 455/454 |
| 2013/0165170 A1* | 6/2013 | Kang | ................ | H04W 72/0453 455/509 |
| 2013/0295947 A1 | 11/2013 | Lee et al. | | |
| 2013/0295948 A1* | 11/2013 | Ye | ................ | H04W 72/0453 455/452.1 |
| 2013/0315187 A1* | 11/2013 | Sawai | ................ | H04W 28/08 370/329 |
| 2014/0016578 A1* | 1/2014 | Lee | ................ | H04W 72/10 370/329 |
| 2014/0018114 A1 | 1/2014 | Jo et al. | | |
| 2014/0038657 A1* | 2/2014 | Jo | ................ | H04W 16/14 455/509 |
| 2014/0051469 A1* | 2/2014 | Kasslin | ................ | H04L 1/00 455/509 |
| 2014/0066086 A1* | 3/2014 | Jo | ................ | H04L 27/0006 455/454 |
| 2014/0135048 A1* | 5/2014 | Kasslin | ................ | H04W 24/02 455/501 |
| 2014/0301237 A1* | 10/2014 | Yi | ................ | H04W 16/14 370/252 |
| 2015/0016383 A1* | 1/2015 | Kim | ................ | H04W 16/14 370/329 |
| 2015/0038139 A1* | 2/2015 | Chun | ................ | H04W 16/14 455/435.1 |
| 2015/0072702 A1* | 3/2015 | Chun | ................ | H04W 16/14 455/454 |
| 2016/0088488 A1* | 3/2016 | Kang | ................ | H04W 16/14 455/450 |

FOREIGN PATENT DOCUMENTS

| | | |
|---|---|---|
| JP | 2012-99982 A | 5/2012 |
| JP | 2012-147207 A | 8/2012 |
| JP | 2014-516485 A | 7/2014 |
| WO | 2010/139058 A1 | 12/2010 |
| WO | 2012/132804 A1 | 10/2012 |

OTHER PUBLICATIONS

International Search Report dated Nov. 8, 2016 in PCT/JP2016/073900 filed Aug. 16, 2016.

Search Report and Written Opinion issued in Singaporean Application 11201300981S dated Oct. 29, 2019.

* cited by examiner

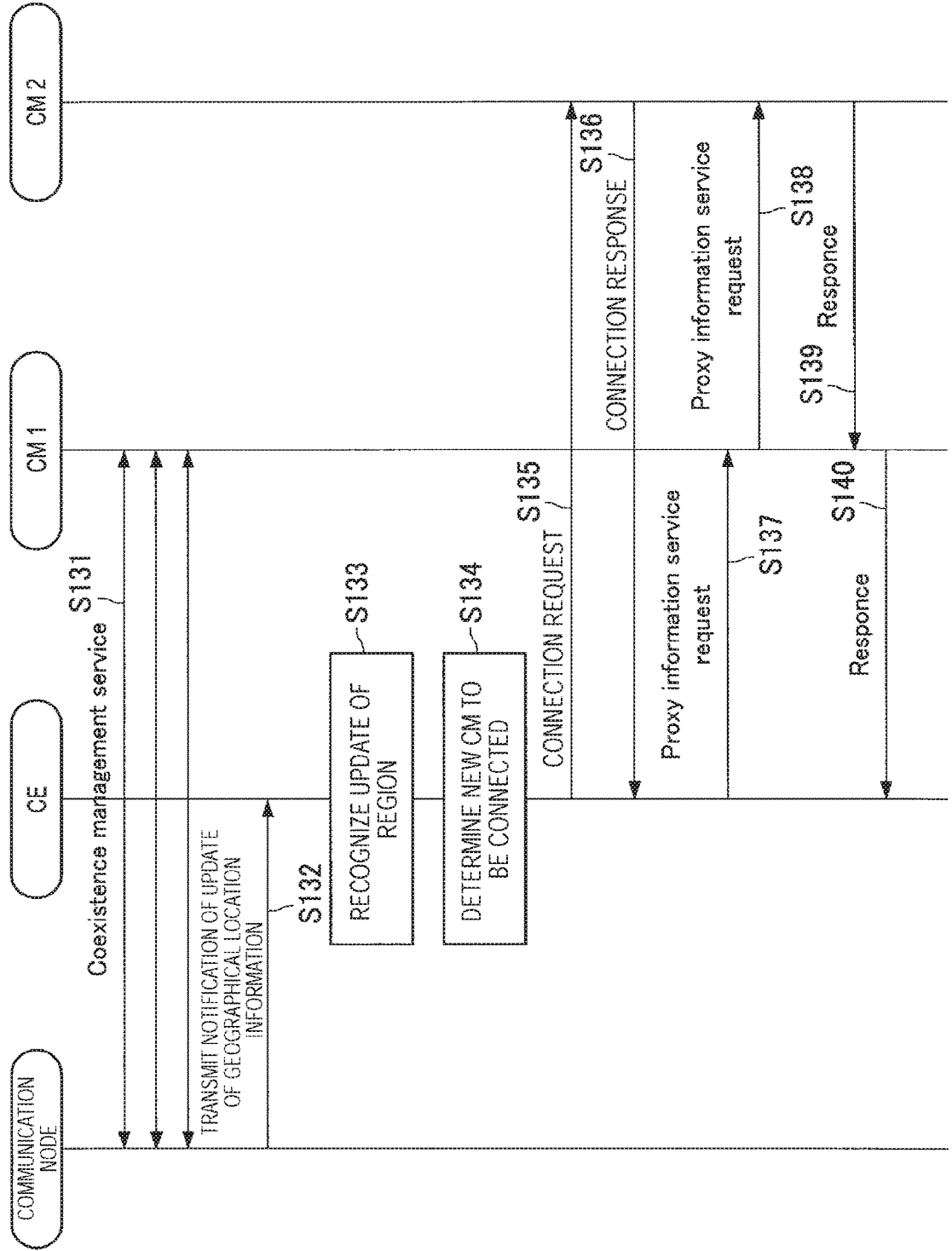

COMMUNICATION CONTROL DEVICE, COMMUNICATION CONTROL DETERMINATION DEVICE, AND METHOD

TECHNICAL FIELD

The present disclosure relates to a communication control device, a communication control determination device, and a method.

BACKGROUND ART

As a countermeasure to alleviate shortage of future frequency resources, secondary usage of frequencies has been discussed. Secondary usage of frequencies means that part of or all of frequency channels allocated to a certain system with a higher priority is secondarily used by another system. Generally, a system to which a frequency channel is allocated with a higher priority is called "primary system", and a system that secondarily uses the frequency channel is called "secondary system".

TV whitespaces are an example of frequency channels that are expected to be secondarily used. TV whitespaces mean frequency channels that are allocated to a TV broadcast system serving as a primary system but are not locally used by the TV broadcast system. By allowing a secondary system to use those TV whitespaces, efficient utilization of frequency resources can be achieved. There are a plurality of standards for wireless access schemes in a physical layer (PHY) and MAC layer for enabling secondary usage of the TV whitespaces, such as IEEE802.22, IEEE802.11af, and European Computer Manufacturer Association (ECMA)-392 (CogNea).

The IEEE802.19 working group has studied smooth coexistence of a plurality of secondary systems using different wireless access schemes. For example, in the IEEE802.19 working group, functions for coexistence of secondary systems are grouped into three function entities, i.e., a coexistence manager (CM), a coexistence enabler (CE), and a coexistence discovery and information server (CDIS). The CM is a functional entity for mainly making a decision for coexistence. The CE is a functional entity serving as an interface for mediating transmission of commands and exchange of information between the CM and a secondary usage node. The CDIS is a functional entity serving as a server for centrally managing information of a plurality of secondary systems.

For example, regarding those functional entities, Patent Literature 1 cited below discloses a technology in which a plurality of functional entities perform neighbor discovery in cooperation with each other.

CITATION LIST

Patent Literature

Patent Literature 1: WO 2012/132804

DISCLOSURE OF INVENTION

Technical Problem

Areas are allocated to CMs specified in the IEEE802.19 working group so that the CMs are in charge of the areas, and, in a case where the CE can move and a CM in charge of the CE is changed because of movement of the CE, the CE needs to be connected to a new CM. However, in the present circumstances, a procedure for connecting the CE to a new CM in a case where the CM in charge of the CE is changed because of movement of the CE is not specified.

In view of this, the present disclosure proposes a communication control device, a communication control determination device, and a method, each of which is new, is improved, and is capable of smoothly exchanging information between a plurality of wireless systems.

Solution to Problem

According to the present disclosure, there is provided a communication control device including: a communication unit configured to transmit geographical location information of the own device or a communication node served by the own device to a communication control determination device that controls coexistence of a plurality of wireless systems; and an acquisition unit configured to acquire, from the communication control determination device, information including information necessary for communication control for coexistence as information regarding another communication control determination device that manages a peripheral region of a geographical region managed by the communication control determination device.

In addition, according to the present disclosure, there is provided a communication control determination device configured to control coexistence of a plurality of wireless systems, the communication control determination device including a control unit configured to generate information including information necessary for communication control for coexistence as information regarding another communication control determination device that controls and determines usage of the wireless systems around a geographical region managed by the own device.

In addition, according to the present disclosure, there is provided a method including: transmitting geographical location information of the own device or a communication node served by the own device to a communication control determination device that controls coexistence of a plurality of wireless systems; and acquiring, from the communication control determination device, information including information necessary for communication control for coexistence as information regarding another communication control determination device that manages a peripheral region of a geographical region managed by the communication control determination device.

In addition, according to the present disclosure, there is provided a method that is executed by a communication control determination device configured to control coexistence of a plurality of wireless systems, the method including generating information including information necessary for communication control for coexistence as information regarding another communication control determination device that controls and determines usage of the wireless systems around a geographical region managed by the own device.

In addition, according to the present disclosure, there is provided a computer program causing a computer to execute transmitting geographical location information of the own device or a communication node served by the own device to a communication control determination device that controls coexistence of a plurality of wireless systems, and acquiring, from the communication control determination device, information including information necessary for communication control for coexistence as information regarding another communication control determination device that manages a peripheral region of a geographical region managed by the communication control determination device.

In addition, according to the present disclosure, there is provided a computer program that is executed by a computer configured to control coexistence of a plurality of wireless systems, the computer program causing the computer to execute generating information including information necessary for communication control for coexistence as information regarding another communication control determination device that controls and determines usage of the wireless systems around a geographical region managed by the own device.

Advantageous Effects of Invention

As described above, according to the present disclosure, it is possible to provide a communication control device, a communication control determination device, and a method, each of which is new, is improved, and is capable of smoothly exchanging information between a plurality of wireless systems.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 12 is a sequence diagram illustrating an operation example of a CE (and a communication node that can integrally move with the CE) and two CMs.

MODE(S) FOR CARRYING OUT THE INVENTION

Figure 1:
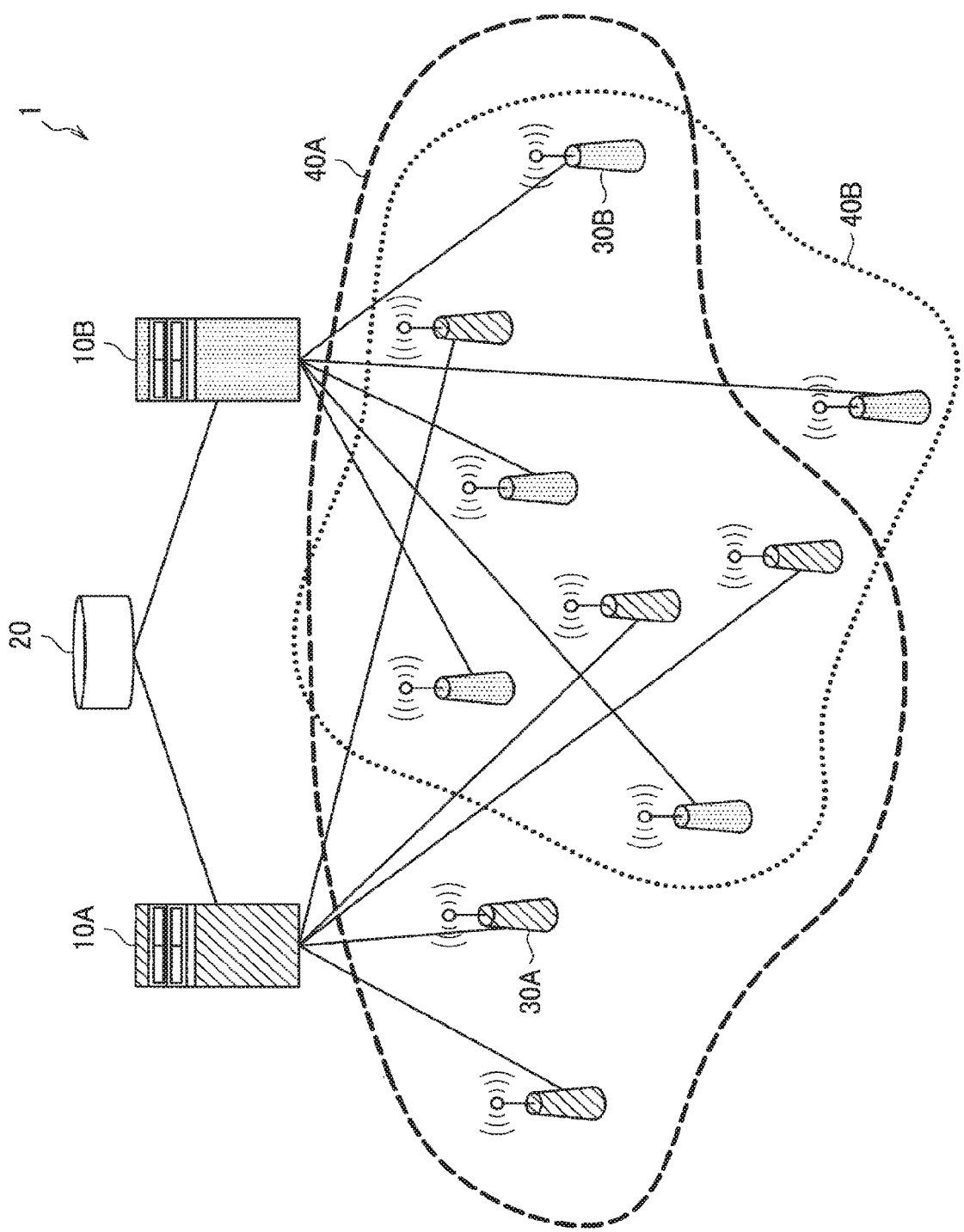
FIG. 1 is an explanatory view for describing an overview of a communication system according to an embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Note that description will be provided in the following order.

1. Embodiment of present disclosure
1.1. Whole configuration of system
1.2. Configuration example
1.3. Operation example
2. Conclusion

1. EMBODIMENT OF PRESENT DISCLOSURE

[1.1. Whole Configuration of System]

FIG. 1 is an explanatory view for describing an overview of a communication system according to an embodiment of the present disclosure.

FIG. 1 illustrates a plurality of secondary usage nodes 30A included in a secondary system A and a plurality of secondary usage nodes 30B included in a secondary system B. As illustrated in FIG. 1, the secondary usage node 30 is a transmitter station such as, typically, a base station or access point. The secondary usage nodes 30A, which are transmitter stations, provide a service of the secondary system A to a receiver station located in a service area 40A. Similarly, the secondary usage nodes 30B, which are transmitter stations, provide a service of the secondary system B to a receiver station located in a service area 40B. Hereinafter, a transmitter station and a receiver station included in a secondary system is collectively referred to as "secondary usage nodes".

The secondary usage nodes 30A and 30B are connected to communication control devices 10A and 10B, respectively. The communication control devices 10 are a device introduced to control coexistence of a plurality of secondary systems that use frequency channels allocated to a primary system. The communication control devices 10A and 10B are connected to a geo-location database (GLDB) 20. The GLDB 20 has a function of notifying each of the secondary systems of a list of available frequencies and/or transmission power and typically protects the primary system (incumbent protection). For example, the communication control device 10 obtains, from the GLDB 20, a frequency band that is allocated to the primary system and can be secondarily used and causes a secondary system to be managed and/or controlled (hereinafter, also simply be referred to as "under management") to use the frequency band.

Note that examples of the primary system encompass TV broadcast systems, program making and special events (PMSE), radars (military radar, ship-based radar, weather radar, or the like), fixed satellite services (FSS), earth exploration satellite services (EESS), and the like.

Herein, in some cases, the service areas 40 (that is, 40A and 40B) of a plurality of secondary systems geographically overlap and frequency bands used therein overlap. Specifically, for example, there is a case where an area where a long term evolution (LTE) service is provided and an area where a Wi-Fi service is provided, which are operated by different operators, overlap.

In the present embodiment, it is expected that, in such a situation, a part or all of a frequency band allocated to a primary system is secondarily used by one or more secondary systems in cooperation with each other. To achieve this, it is desirable that information can be smoothly exchanged between a plurality of secondary systems.

Figure 2:
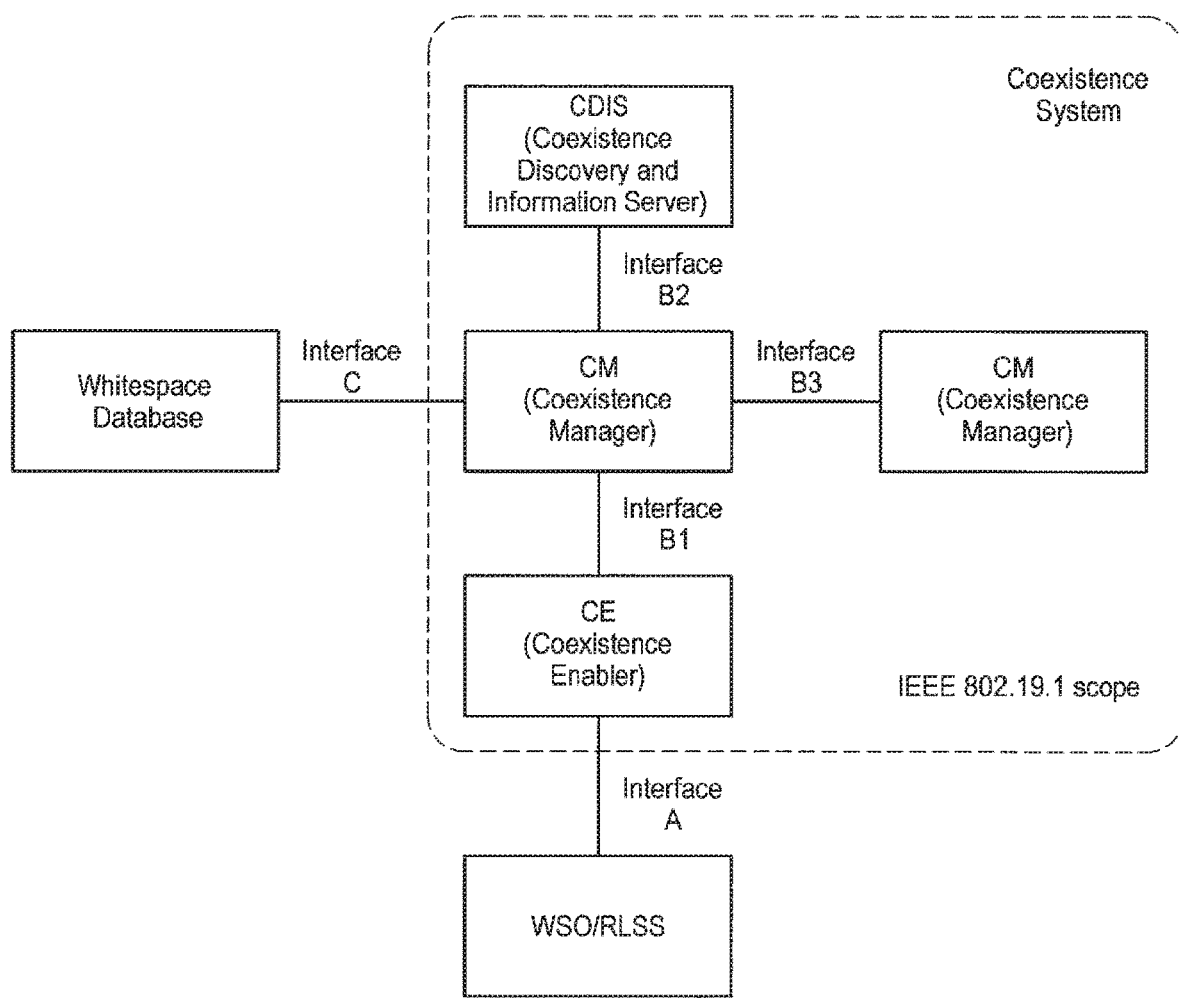
FIG. 2 is an explanatory view illustrating a correlation between three functional entities for assistance in coexistence.

FIG. 2 is an explanatory view illustrating a correlation between three functional entities for assistance in coexistence. As illustrated in FIG. 2, in IEEE802.19.1, functions for assistance in coexistence of secondary systems are grouped into three functional entities, i.e., a CM, a CE, and a CDIS.

(1) Coexistence Manager (CM)

A CM is a functional entity for performing making a decision for coexistence. The CM acquires information regarding a primary system, information regarding an available channel, and information regarding a secondary system. The CM acquires information from a CDIS, another CM, a secondary usage node (accessed via a CE), and the like. Based on those pieces of information, the CM determines which frequency channel is to be used by a secondary usage node under management of the CM itself in order to operate a secondary system. For each secondary usage node, the CM may further determine additional control parameters such as maximum transmission power, a recommended wireless access scheme, and an update cycle of location data. Then, the CM causes each secondary usage node to operate or reconfigure a secondary system in accordance with the determined parameters.

(2) Coexistence Enabler (CE)

A CE is a functional entity serving as an interface for mediating transmission of a command and exchange of information between a CM and a secondary usage node. For example, the CE converts information possessed by the secondary usage node into a form usable by the CM and transmits the converted information to the CM. Further, the CE converts a command of coexistence of secondary systems from the CM into a form executable by the secondary usage node and transmits the converted command to the secondary usage node.

(3) Coexistence Discovery and Information Server (CDIS)

A CDIS is a functional entity serving as a server for managing information of a plurality of secondary systems. For example, the CDIS collects information regarding a secondary system from each secondary usage node via a CE and a CM. Further, the CDIS collects, from the GLDB 20, information regarding a primary system and information regarding an available channel. Then, the CDIS accumulates the collected information in a database. The information accumulated by the CDIS is used in a case where the CM makes a decision for coexistence. The CDIS may select a master CM (CM that controls a plurality of CMs and makes a decision in a centralized manner) from a plurality of CMs. Further, the CDIS has a neighbor discovery function of detecting neighbor secondary systems that may interfere with each other.

At least one of the above three-types of functional entities is implemented in each of the communication control devices 10 illustrated in FIG. 1. Note that part of the functional entities may be implemented in each secondary usage node 30. Further, part of the functional entities may be implemented in the same device as the GLDB 20.

Note that the above three-types of functional entities will also be collectively referred to as "coexistence system". The coexistence system assists in coexistence of secondary systems under management thereof.

(4) Whitespace Object (WSO)

The WSO is one of secondary usage nodes. In IEEE Std 802.19.1-2014, the WSO indicates a television whitespace (TVWS) device or a network of TVWS devices. In the present embodiment, the WSO is not limited to the TVWS device or the network of the TVWS devices and indicates any secondary usage node or any network of secondary systems. The WSO is connected to a CM via a CE in order to receive a coexistence service that is a service for coexistence of secondary systems. Note that the WSO is a kind of communication node.

(5) Registered Location Secure Server (RLSS)

An RLSS is a local server for preventing interference between terminals. The WSO is connected to the GLDB 20 via the RLSS. The RLSS is specified in IEEE Std 802.11af that is one of standards for providing a wireless access scheme for TVWSs. In IEEE Std 802.19.1-2014, the RLSS is an entity that stores information organized by using a geographical location, accesses a database storing operation parameters and locations for one or a plurality of basic service sets, and manages the database.

Hereinabove, details of each of the functional entities have been described. The functional entities can exchange information with each other by using an interface. As illustrated in FIG. 2, the CE and the WSO/RLSS can exchange information via an interface A. The CM and the CE can exchange information via an interface B1. The CM and the CDIS can exchange information via an interface B2. The CMs can exchange information via an interface B3. The CM and a whitespace database can exchange information via an interface C.

Figure 3:
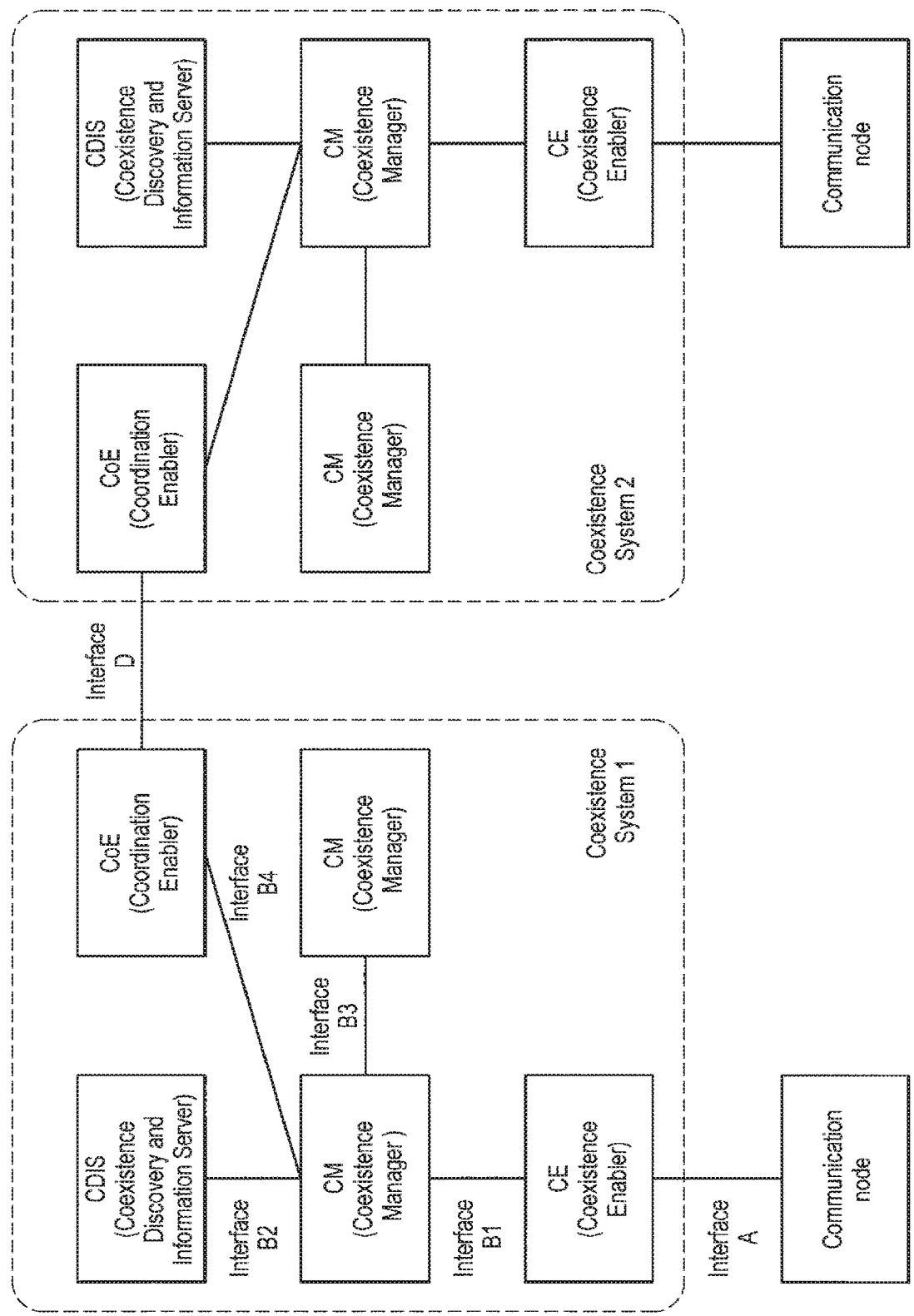
FIG. 3 is an diagram illustrating four functional entities for assistance in coexistence.

FIG. 3 is a view for describing four functional entities for assistance in coexistence. As illustrated in FIG. 3, a coordination enabler (CoE) may be introduced into a coexistence system. This entity exchanges information with a coexistence system whose manager is different or an entity existing outside. The CoE may be implemented in the communication control device 10 illustrated in FIG. 1, may be implemented in each secondary usage node 30, may be implemented in the same device as the GLDB 20, or may be implemented in any other arbitrary devices. Note that an interface may be provided between the GLDB and the CM as in FIG. 2.

Figure 4:
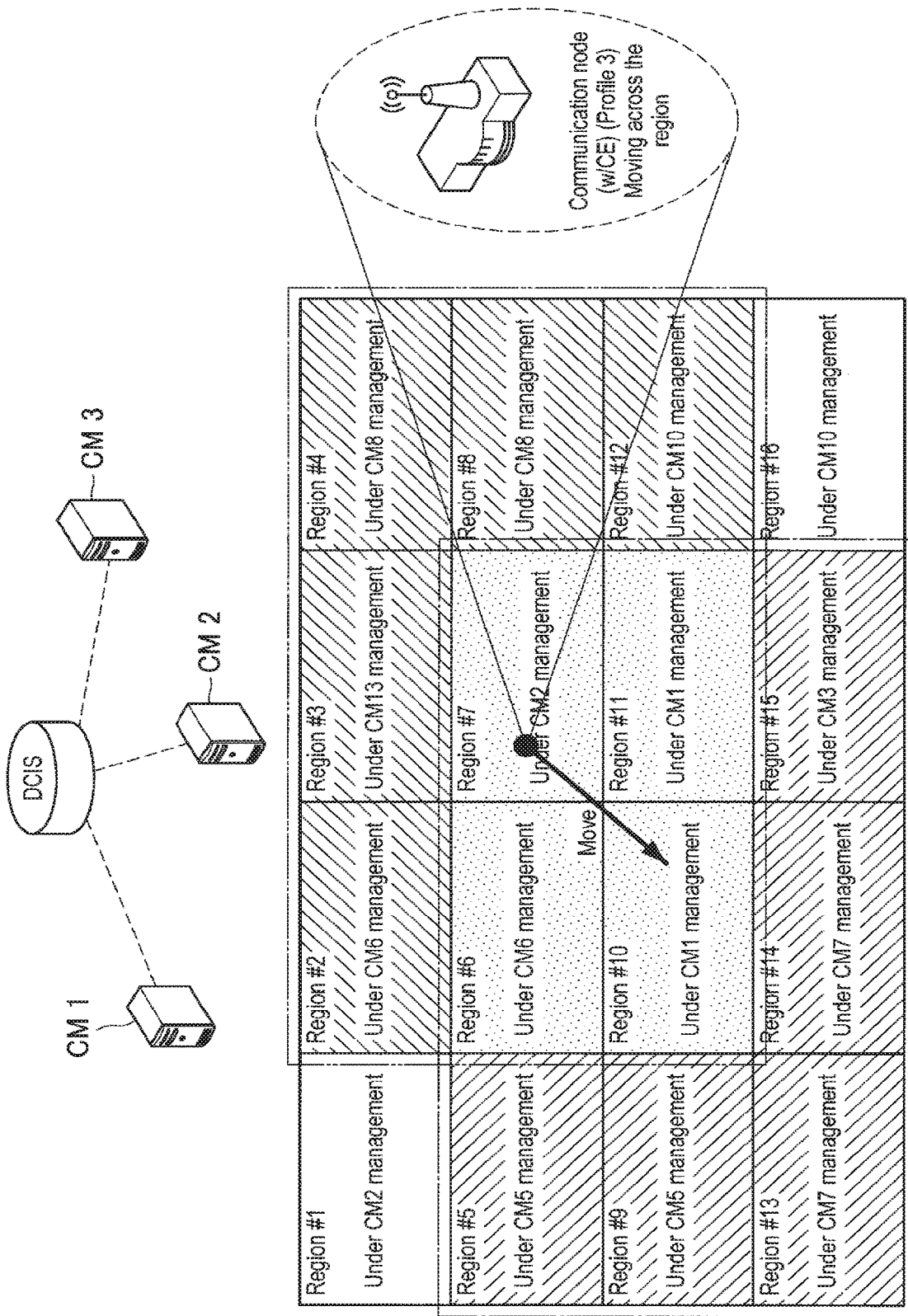
FIG. 4 is an explanatory view for describing a scenario in which areas are allocated to CMs so that the CMs are in charge of the areas.

In the communication system having such function entities, there is assumed a scenario in which areas (countries, states, or the like) are allocated to CMs so that the CMs are in charge of the CMs. FIG. 4 is an explanatory view for describing a scenario in which areas are allocated to CMs so that the CMs are in charge of the areas. FIG. 4 illustrates a state in which CMs are allocated to sixteen areas. In FIG. 4, for example, a CM 2 is allocated to a region #7, and a CM 1 is allocated to a region #10. The same applies to the other regions.

In such a case, it is assumed that a communication node (node corresponding to a base station or access point) including a CE or a communication node that can integrally move with the CE moves across a region. For example, FIG. 4 illustrates a state in which the communication node including the CE (or the communication node that can integrally move with the CE) moves from the region #7 to the region #10. In this case, CMs in charge of management of the regions are different, and therefore the CE needs to change the connected CM. That is, when the communication node including the CE (or the communication node that can integrally move with the CE) moves from the region #7 to the region #10, the CE needs to change the connected CM from the CM 2 to the CM 1.

It is considered that, by causing the CE to store not only information of a CM that is currently connected but also information of CMs that manage peripheral regions, it is possible to smoothly connect the CE to a CM in charge of a destination region even in a case where the CE moves across a region and continuously provide a coexistence service. However, IEEE Std 802.19.1-2014 does not provide such a mechanism.

In view of the above points, a disclosing party of the present application has diligently studied a technology capable of smoothly connecting a CE to a CM in charge of a destination region even in a case where the CE moves across a region and continuously providing a coexistence service. As a result, the disclosing party of the present application has devised a technology capable of, by causing a CE to store not only information of a CM that is currently connected but also information of CMs that manage peripheral regions, smoothly connecting the CE to a CM in charge of a destination region even in a case where the CE moves across a region and continuously providing a coexistence service.

[1.2. Configuration Example]

Next, respective function configuration examples of the CE, the CM, and the CDIS will be described.

Figure 5:
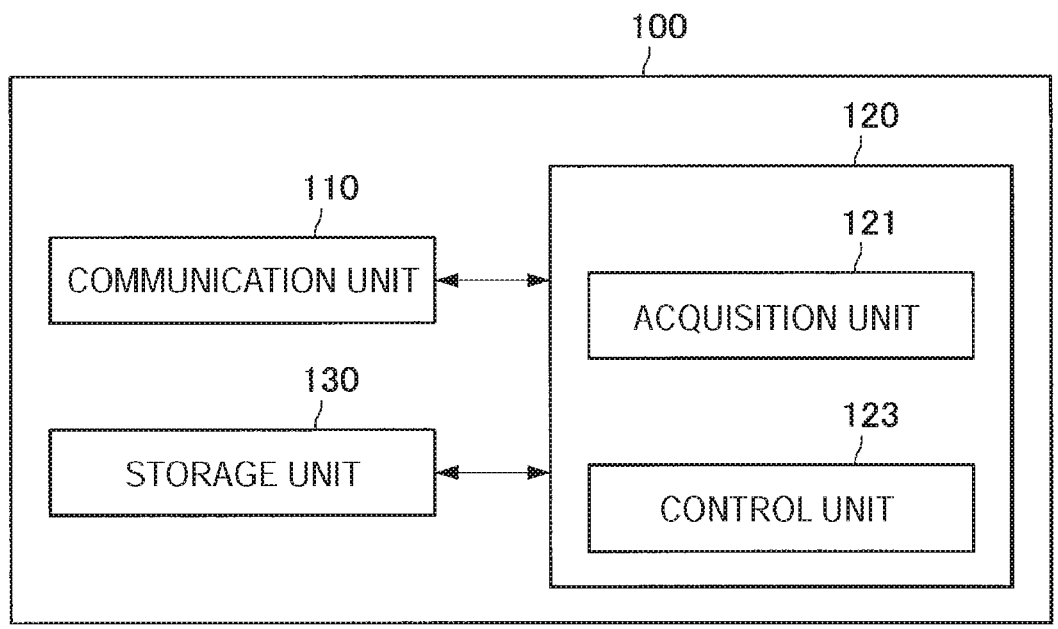
FIG. 5 is an explanatory view illustrating a functional configuration example of a device 100 that can function as a CE.

FIG. 5 is an explanatory view illustrating a functional configuration example of a device 100 that can function as the CE. As illustrated in FIG. 5, the device 100 includes a communication unit 110, a processing unit 120, and a storage unit 130. Further, the processing unit 120 includes an acquisition unit 121 and a control unit 123.

The communication unit 110 performs communication of information with another device. The communication unit 110 can, for example, include an antenna in a case of wireless communication and include an interface for wired communication in a case of wired communication. Further, the communication unit 110 can include a communication circuit for communication processing of information. The communication unit 110 transmits information received from another device to the processing unit 120.

The processing unit 120 is made up of, for example, a central processing unit (CPU), a read only memory (ROM), a random access memory (RAM), and the like and provides various functions of the device 100. Note that the processing unit 120 can further include a constituent element in addition to the acquisition unit 121 and the control unit 123. That is, the processing unit 120 can also perform operation in addition to operation of the acquisition unit 121 and the control unit 123.

The acquisition unit 121 acquires various kinds of information that the communication unit 110 receives from another device.

The control unit 123 controls operation of the device 100. In a case where the control unit 123 controls operation of the device 100, the control unit 123 can use information acquired by the acquisition unit 121 and information stored on the storage unit 130.

The storage unit 130 is made up of, for example, an HDD, an SSD, a flash memory, and other another storage media and stores various kinds of information.

In the present embodiment, the communication unit 110 transmits geographical location information of the device 100 or a communication node served by the device 100 to a CM (e.g., a device 200 that can function as described below) which controls coexistence of a plurality of secondary systems (an example of a plurality of wireless systems in the present disclosure) which secondarily use a frequency band allocated to a predetermined primary system.

Further, the acquisition unit 121 acquires, from a CM (e.g., the device 200 that can function as described below), information including information necessary for communication control for coexistence as information regarding another CM that manages a peripheral region of a geographical region managed by the above CM.

Then, the control unit 123 recognizes a change in the geographical location information of the device 100 or the communication node served by the device 100 and selects, by using the information acquired by the acquisition unit 121, a CM suitable for the communication node whose geographical location information has been changed.

Figure 6:
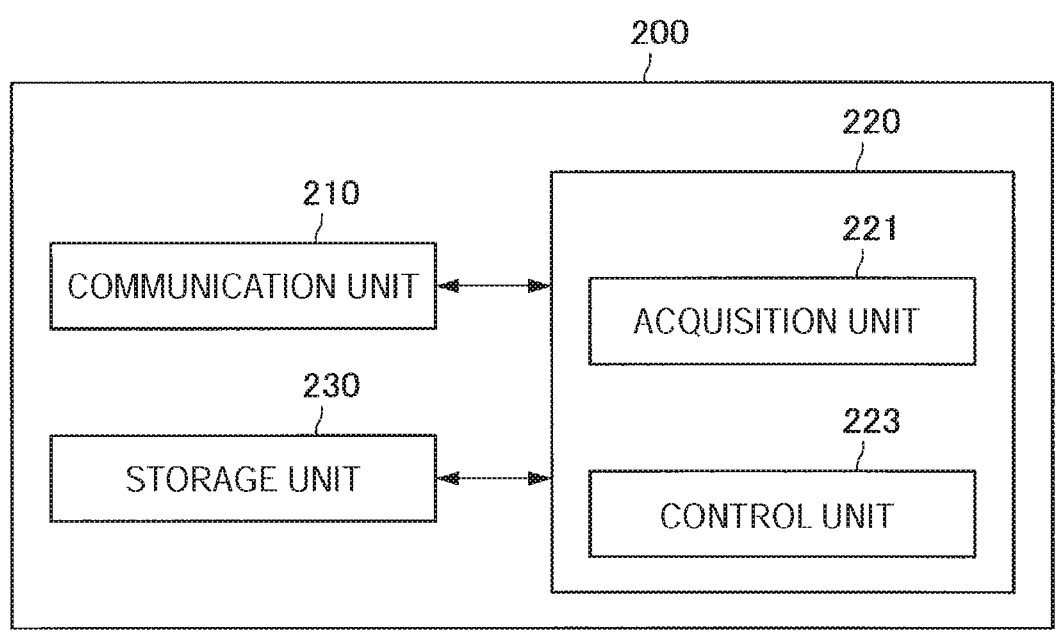
FIG. 6 is an explanatory view illustrating a functional configuration example of a device 200 that can function as a CM.

FIG. 6 is an explanatory view illustrating a functional configuration example of the device 200 that can function as the CM. As illustrated in FIG. 6, the device 200 includes a communication unit 210, a processing unit 220, and a storage unit 230. Further, the processing unit 220 includes an acquisition unit 221 and a control unit 223.

The communication unit 210 performs communication of information with another device. The communication unit 210 can, for example, include an antenna in a case of wireless communication and include an interface for wired communication in a case of wired communication. Further, the communication unit 210 can include a communication circuit for communication processing of information. The communication unit 210 transmits information received from another device to the processing unit 220.

The processing unit 220 is made up of, for example, a CPU, a ROM, a RAM, and the like and provides various functions of the device 200. Note that the processing unit 220 can further include a constituent element in addition to the acquisition unit 221 and the control unit 223. That is, the processing unit 220 can also perform operation in addition to operation of the acquisition unit 221 and the control unit 223.

The acquisition unit 221 acquires various kinds of information that the communication unit 210 receives from another device.

The control unit 223 controls operation of the device 200. In a case where the control unit 223 controls operation of the device 200, the control unit 223 can use information acquired by the acquisition unit 221 and information stored on the storage unit 230.

The storage unit 230 is made up of, for example, an HDD, an SSD, a flash memory, and other another storage media and stores various kinds of information.

In the present embodiment, the control unit 223 generates, as information regarding other CMs around a geographical region managed by the device 200, information including information necessary for communication control for coexistence of secondary systems (an example of a plurality of wireless systems in the present disclosure) which secondarily use a frequency band. The information necessary for communication control for coexistence of secondary systems can include, for example, information of the geographical region managed by the device 200, information regarding a coexistence profile possessed by the device 200, and the like.

Figure 7:
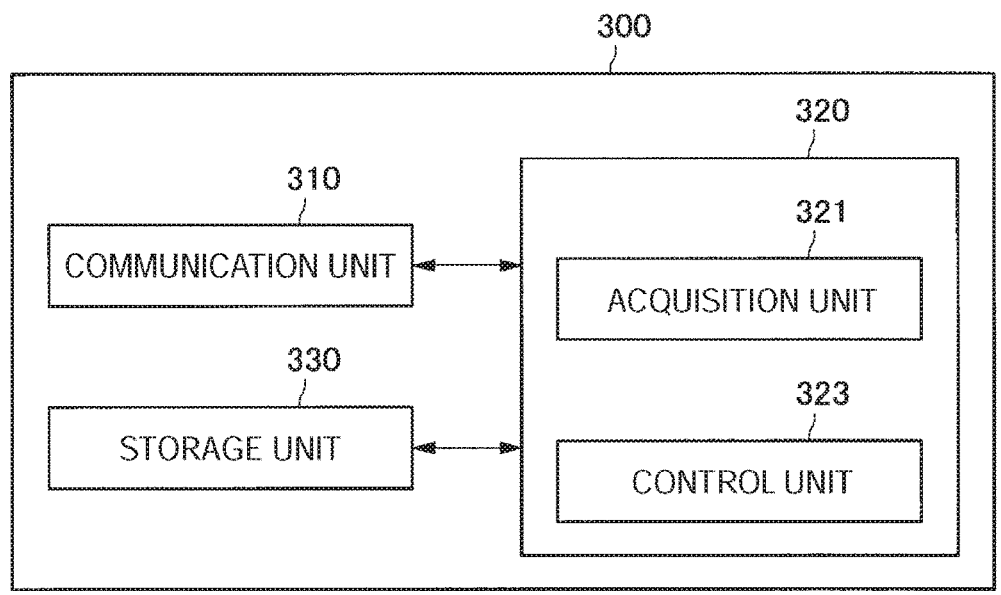
FIG. 7 is an explanatory view illustrating a functional configuration example of a device 300 that can function as a CDIS.

FIG. 7 is an explanatory view illustrating a functional configuration example of the device 300 that can function as the CDIS. As illustrated in FIG. 7, the device 300 includes a communication unit 310, a processing unit 320, and a storage unit 330. Further, the processing unit 320 includes an acquisition unit 321 and a control unit 323.

The communication unit 310 performs communication of information with another device. The communication unit 310 can, for example, include an antenna in a case of wireless communication and include an interface for wired communication in a case of wired communication. Further, the communication unit 310 can include a communication circuit for communication processing of information. The communication unit 310 transmits information received from another device to the processing unit 320.

The processing unit 320 is made up of, for example, a CPU, a ROM, a RAM, and the like and provides various functions of the device 300. Note that the processing unit 320 can further include a constituent element in addition to the acquisition unit 321 and the control unit 323. That is, the processing unit 320 can also perform operation in addition to operation of the acquisition unit 321 and the control unit 323.

The acquisition unit 321 acquires various kinds of information that the communication unit 310 receives from another device.

The control unit 323 controls operation of the device 300. In a case where the control unit 323 controls operation of the device 300, the control unit 323 can use information acquired by the acquisition unit 321 and information stored on the storage unit 330.

The storage unit 330 is made up of, for example, an HDD, an SSD, a flash memory, and other another storage media and stores various kinds of information.

[1.3. Operation Examples]

First, there will be described an operation example where the CE acquires not only information of a CM in charge of management of a current region but also information of CMs in charge of management of peripheral regions.

Figure 8:
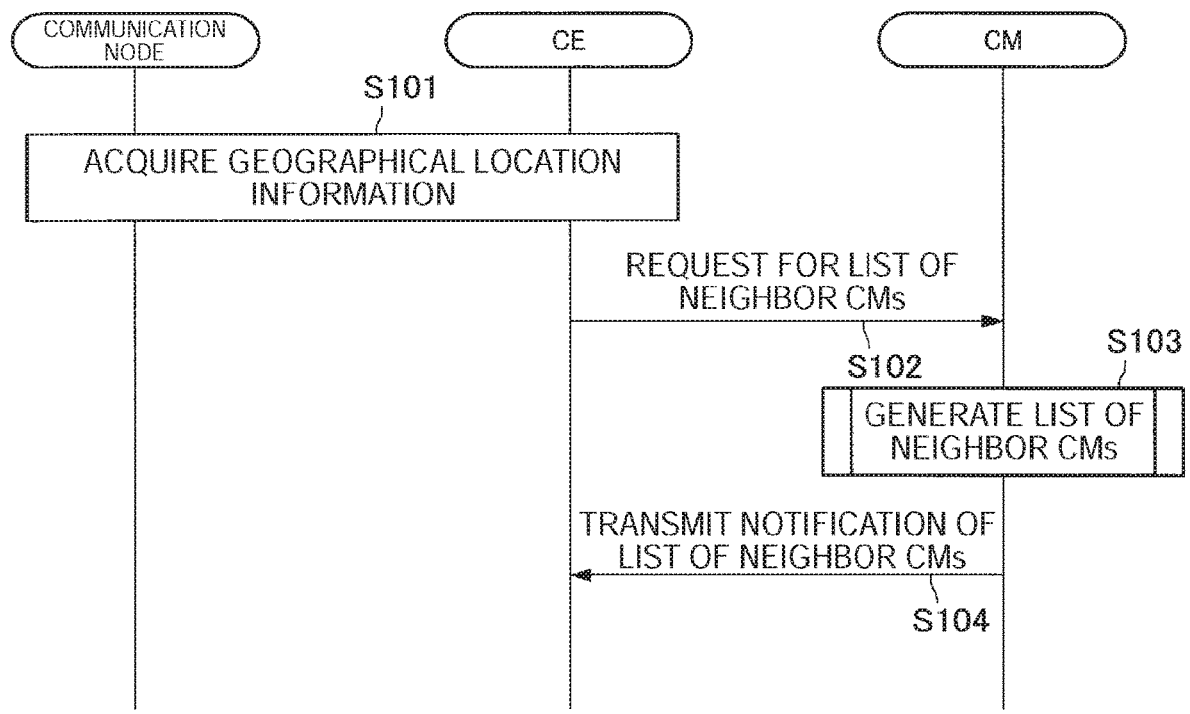
FIG. 8 is a sequence diagram illustrating an operation example of a CE (and a communication node that can integrally move with the CE) and a CM.

FIG. 8 is a sequence diagram illustrating an operation example of the CE (and a communication node that can integrally move with the CE) and a CM. FIG. 8 illustrates an operation example where the CE acquires not only information of a CM in charge of management of a current region but also information of CMs in charge of management of peripheral regions.

The CE or communication node acquires current geographical location information (Step S101). To acquire geographical location information, for example, a location detection function that the CE or communication node has can be used. Specifically, the location detection function can include a global navigation satellite system (GNSS) receiver, a communication device, and/or the like. The GNSS can include, for example, a global positioning system (GPS), a global navigation satellite system (GLONASS), a BeiDou navigation satellite system (BDS), a quasi-zenith satellites system (QZSS), a Galileo, or the like.

When the current geographical location information is acquired in Step S101, the CE transmits a request for a list of CMs that manage neighbor regions (referred to as "list of neighbor CMs") to a CM that manages a current region (Step S102). The CE can cause the request to include the current geographical location information acquired in Step S101 described above or identification information capable of identifying a current geographical location.

When the CM receives the request for a list of neighbor CMs from the CE, the CM generates a list of neighbor CMs for the CE (Step S103). A specific example of processing for generating a list of neighbor CMs will be described below.

When the CM generates the list of neighbor CMs for the CE that has transmitted the request for the list of neighbor CMs in Step S103 described above, then the CM transmits a notification of the generated list of neighbor CMs to the CE (Step S104). The CM may cause the list of neighbor CMs to include at least information for identifying CMs (e.g., IDs), IP addresses of the CMs, and information regarding regions in its charge.

The CE (and the communication node that can integrally move with the CE) and the CM execute the series of operation illustrated in FIG. 8, and therefore the CE can acquire not only information of a CM in charge of management of a current region but also information of CMs in charge of management of peripheral regions. Note that the CE may regularly execute the procedure for acquiring a list of neighbor CMs illustrated in FIG. 8 or may execute the procedure in a case where it is recognized that a change in the geographical location information of the communication node becomes equal to or more than a predetermined threshold (e.g., one kilometer to about a dozen kilometers).

Figure 9:
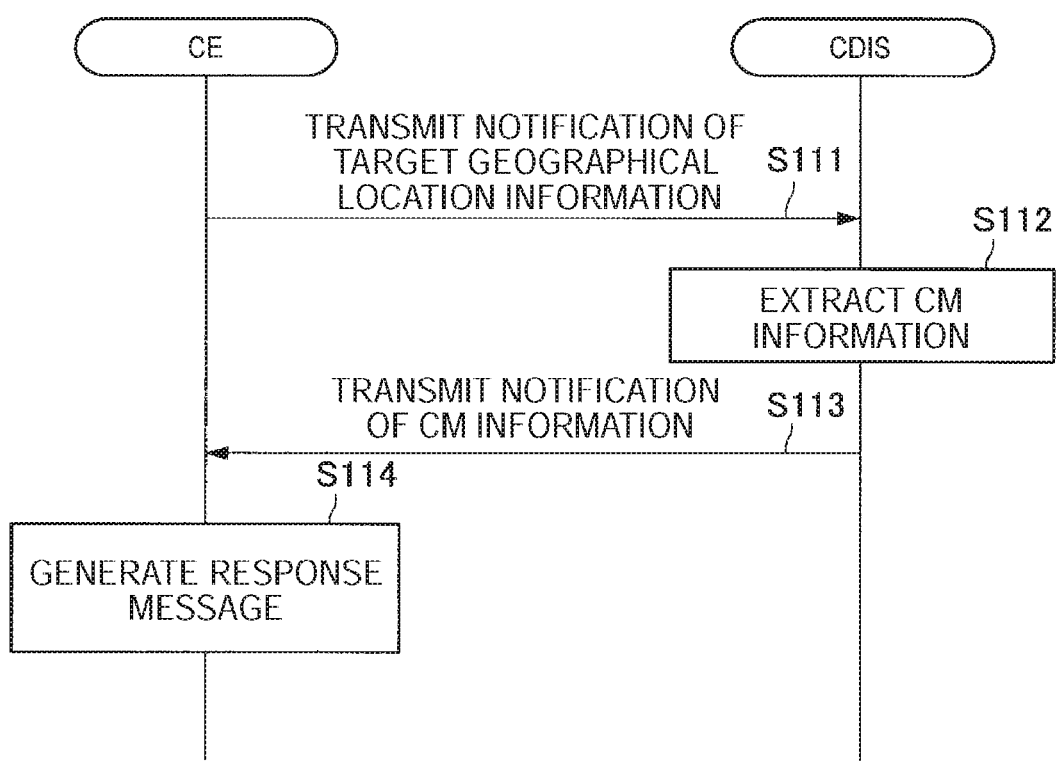
FIG. 9 is a sequence diagram illustrating an operation example of a CM and a CDIS.

Next, processing in which the CM generates a list of neighbor CMs will be described. FIG. 9 is a sequence diagram illustrating an operation example of the CM and the CDIS. FIG. 9 illustrates an operation example where the CM generates a list of neighbor CMs.

When the CM receives a request for a list of neighbor CMs from the CE, first, the CM transmits a notification of target geographical location information to the CDIS (Step S111). Herein, the geographical location information that the CM has transmitted to the CDIS as a notification is geographical location information acquired by the CM from the CE.

When the CDIS receives the notification of the geographical location information from the CM, the CDIS extracts CM information on the basis of the geographical location information that has been transmitted as a notification (Step S112).

When referring to FIG. 4, in a case where the geographical location information that has been transmitted from the CM as a notification is included in the region #7, the CDIS extracts CM information of CMs in charge of regions #2, #3, #4, #6, #8, #10, #11, and #12 that are adjacent regions. That is, the CDIS extracts CM information of the CM 1, a CM 6, a CM 8, a CM 10, and a CM 13. The CDIS extracts, as the CM information, information for identifying the CMs (e.g., IDs), IP addresses of the CMs, and information regarding the regions in its charge.

When the CDIS extracts CM information in Step S112, the CDIS transmits a notification of the extracted CM information to the CM (Step S113). When the CM receives the notification of the CM information from the CDIS, the CM generates a response message (message including the list of neighbor CMs) by using the CM information that has been transmitted as a notification (Step S114).

The CM and the CDIS execute the series of operation illustrated in FIG. 9, and therefore the CM can acquire, from the CDIS, information of CMs in charge of management of peripheral regions of a region that the CM itself is in charge of and can provide the information to the CE.

In a case where the CDIS transmits the notification of the CM information, the CDIS may extract only CM information that is a difference between current notification and previous notification. When referring to FIG. 4, for example, in a case where, after CM information of the CMs in charge of the regions #2, #3, #4, #6, #8, #10, #11, and #12 is extracted, the CE moves and CM information of CMs in charge of regions #5, #6, #7, #9, #11, #13, #14, and #15 is extracted, the CDIS may extract only CM information of CMs in charge of the regions #5, #9, #13, #14, and #15.

Next, there will be described operation performed in a case where the CE needs to change a connected CM because the communication node moves across a region.

Figure 10:
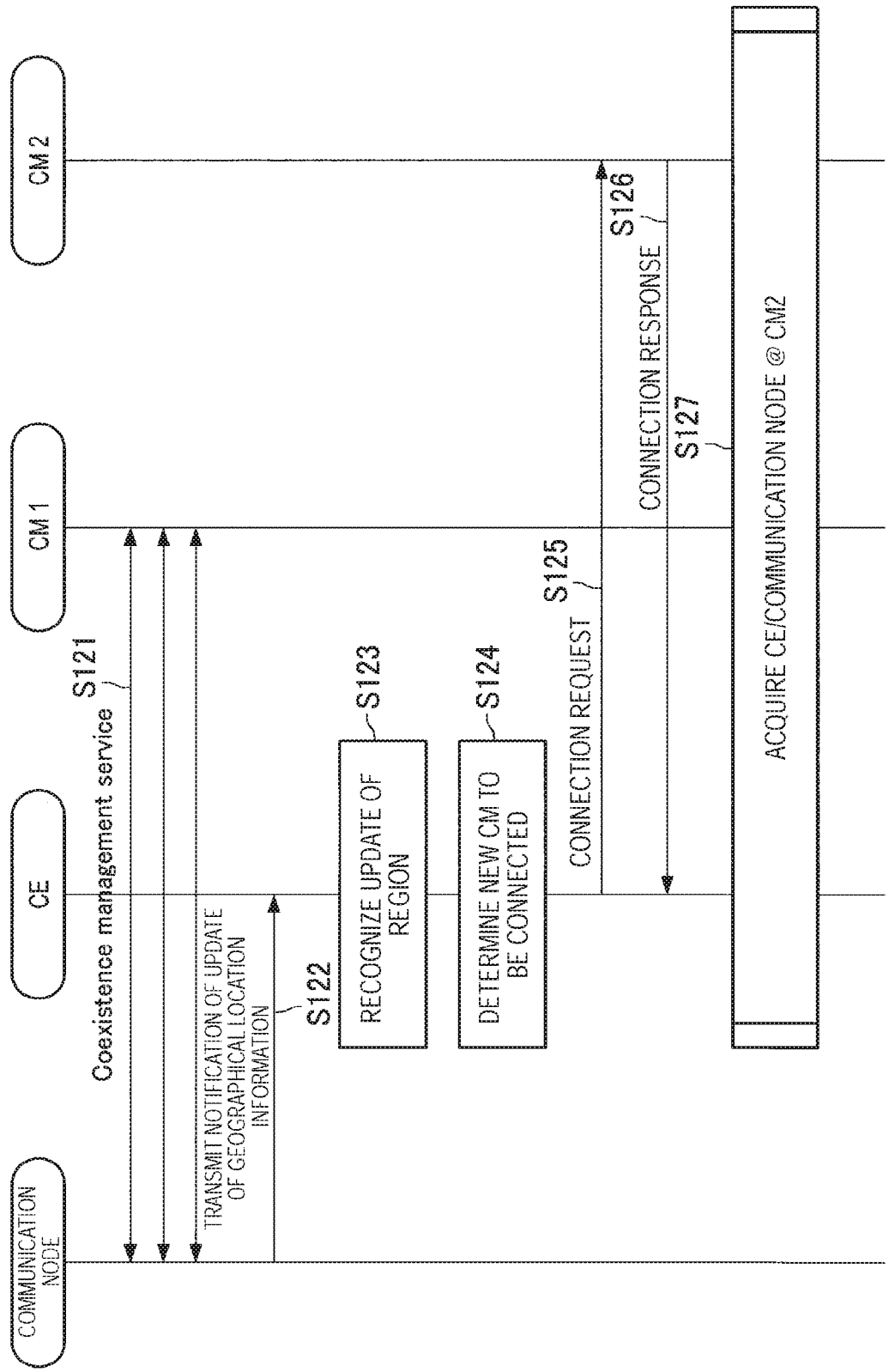
FIG. 10 is a sequence diagram illustrating an operation example of a CE (and a communication node that can integrally move with the CE) and two CMs.

FIG. 10 is a sequence diagram illustrating an operation example of the CE (and a communication node that can integrally move with the CE) and two CMs (CM 1 and CM 2). FIG. 10 illustrates an operation example performed in a case where the CE needs to change a connected CM because the communication node moves across a region.

A movable communication node receives provision of a coexistence service from the CM 1 (Step S121), and the communication node regularly transmits a notification of an update of geographical location information to the CE or transmits a notification of the update thereof in a case where a change in the geographical location information becomes a predetermined threshold or more (e.g., one kilometer to about a dozen kilometers) (Step S122).

When the CE recognizes a change of region on the basis of the geographical location information that has been transmitted as a notification from the communication node (Step S123), the CE determines a new CM to be connected with reference to a list of neighbor CMs acquired from a CM (e g, the CM 1 that currently provides the coexistence service) in advance (Step S124). Herein, the CE determines the CM 2 as the new CM to be connected.

When the CE determines the CM 2 as the new CM to be connected, the CE transmits a connection request to the CM 2 (Step S125) The CM 2 returns, to the CE, a message including connection permission/rejection of the CE that has transmitted the connection request as a connection response (Step S126).

When the CM 2 accepts connection of the CE and returns the connection response to the CE, the CM 2 acquires the information of the CE or communication node (Step S126). The CM 2 may directly acquire information from the CE or may acquire the information from the CM 1 that is a CM connected to the CE before change. In a case where the CM 2 acquires information from the CM 1 that is a CM connected to the CE before change, the connection request of the CE in Step S125 described above desirably includes information of the CM 1, i.e., the CM connected before change.

The CE (and the communication node that can integrally move with the CE) and the two CMs execute the operation illustrated in FIG. 10, and therefore, even in a case where the CE needs to change the connected CM because the communication node moves across a region, the CE can smoothly change the connected CM.

Hereinabove, an example of the whole flow of a procedure for changing a connected CM because of movement has been described on the assumption that geographical regions managed and controlled by a plurality of CMs are clearly separated.

However, the above description does not consider functions of a CM (e.g., a coexistence service providable by the CM, a coexistence profile possessed by the CM, or the like) or functions or requirements of the CE (e.g., a coexistence service desired by the CE or a coexistence profile possessed by the CE), or the like. Actually, considering the above points, it is easily conceivable that the CE may not be supported by a CM that manages or controls a destination geographical region. This problem can be solved by modifying the above example.

Figure 11:
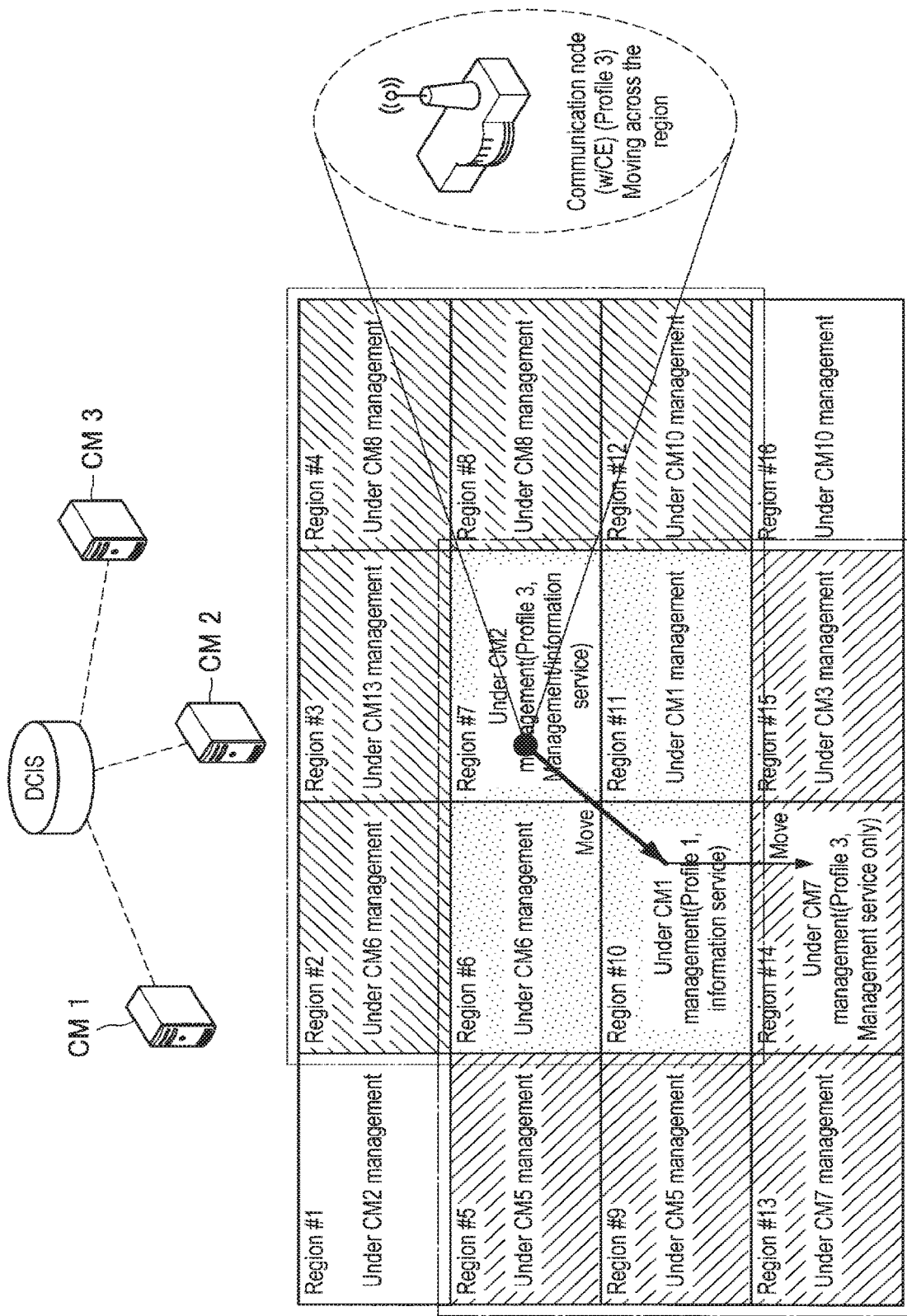
FIG. 11 is an explanatory view for describing a scenario in which areas are allocated to CMs so that the CMs are in charge of the areas.

FIG. 11, as well as FIG. 4, is an explanatory view for describing a scenario in which areas are allocated to CMs so that the CMs are in charge of the areas. FIG. 4 illustrates a state in which CMs are allocated to sixteen areas.

As illustrated in FIG. 11, it is assumed that the communication node including the CE (or the communication node that can integrally move with the CE) which possesses a profile 3 as a coexistence profile moves to the region #7, to the region #10, and to the region #14. The CM 2 in charge of the region #7 is assumed to possess the profile 3, and the CM 1 in charge of the region #10 is assumed to possess a profile 2. In this case, the CE and the CM 1 that manages the region #10 possess different coexistence profiles, and therefore the CE cannot directly receive a coexistence service from the CM 1.

In view of this, the CM 2 in the region #7 to which the CE has originally been connected "receives an information service from the CM 1 instead of the CE and transmits, to the CE, a notification of information regarding coexistence included in the information service from the CM 1". That is, the CM 2 serves as a proxy for the CM 1. Because the CM 2 serves as a proxy for the CM 1, the system side can continuously provide a coexistence service to the CE even in a case where the communication node including the CE (or the communication node that can integrally move with the CE) which possesses the profile 3 moves from the region #7 to the region #10.

When the communication node further moves to the region #14, the CM 7 that manages the region #14 supports the profile 3, and therefore the CE can change the connected CM by applying the procedure illustrated in FIG. 10 without a change.

The CM has a function of mediating an information service of another CM and can therefore realize such a series of operation.

In order that the CM realizes a function of mediating an information service of another CM, the above list of neighbor CMs includes an "identifier indicating a type of a providable coexistence service" and an "identifier indicating a coexistence profile". The "identifier indicating a type of a providable coexistence service" may be, for example, the following class information.

CM Class 1: to provide both an information service and a management service
CM Class 2: to provide only a management service
CM Class 3: to provide only an information service In a case where the CE determines that the communication node has moved to a geographical region managed or controlled by a CM possessing a coexistence profile that cannot be supported, the CE requests a proxy provision service (referred to as "proxy service") from a CM that is currently connected. The CE causes this request to include at least information indicating a currently location (information acquired by the GNSS, region information, or the like). Further, the CE may cause the request to include information (ID or the like) of a CM that originally provides a coexistence service in the location.

The CM that is currently connected (hereinafter, referred to as "proxy CM") acquires, on the basis of the request from this CE, a list of channels provided in the information service from the target CM and transmission power. The list of channels provided in the information service and transmission power may be a list registered in the CDIS. Alternatively, the CM may directly acquire information from another CM via a CoE. The CE acquires the list of channels and transmission power from the proxy CM and sets a communication node.

In a case where it is determined that the communication node further moves and moves to a geographical region managed or controlled by a CM that possesses the same coexistence profile as that of the CE, the CE transmits a notification of termination of the proxy service to the proxy CM. Then, the CE changes the connected CM on the basis of the procedure example illustrated in FIG. 10. At this time, the proxy CM may transfer information of the CE and communication node stored therein to a new CM to be connected.

Hereinabove, there has been described an example where the CE and a CM that manages a destination geographical region possess different coexistence profiles. Such a case can occur in, for example, roaming or the like.

Even in a case where the CE and a CM possess the same coexistence profile, it is possible to apply a method used in a case where the CE and a CM that manages a destination geographical region possess different coexistence profiles. For example, although the CE attempts to be connected to a destination CM (that possesses the same coexistence profile), the CE cannot complete connection because a calculation load of the CM at that time is large in some cases.

In such a case, the CE may transmit a request for a proxy service to a CM that manages a geographical region before change so as to cause the CM to provide an information service in a current geographical region by proxy. By, although the CE and the CM possess the same coexistence profile, applying the method used in a case where the CE and a CM that manages a destination geographical region possess different coexistence profiles, it is possible to expect an effect of distributing a load of the CM.

FIG. 12 is a sequence diagram illustrating an operation example of the CE (and a communication node that can integrally move with the CE) and two CMs (CM 1 and CM 2). FIG. 12 illustrates an operation example performed in a case where the CE needs to change a connected CM because the communication node moves across a region. Further, FIG. 12 illustrates an operation example performed in a case where a request for a proxy service is transmitted to a CM that manages a geographical region before change so as to cause the CM to provide an information service in a current geographical region by proxy.

A movable communication node receives provision of a coexistence service from the CM 1 (Step S131), and the communication node regularly transmits a notification of an update of geographical location information to the CE or transmits a notification of the update thereof in a case where a change in the geographical location information becomes a predetermined threshold or more (e.g., one kilometer to about a dozen kilometers) (Step S132)

When the CE recognizes a change of region on the basis of the geographical location information that has been transmitted as a notification from the communication node (Step S133), the CE determines a new CM to be connected with reference to a list of neighbor CMs acquired from a CM (e.g., the CM 1 that currently provides the coexistence service) in advance (Step S134). Herein, the CE determines the CM 2 as a new CM to be connected.

When the CE determines the CM 2 as a new CM to be connected, the CE transmits a connection request to the CM 2 (Step S135). The CM 2 returns, to the CE, a message including connection permission/rejection of the CE that has transmitted the connection request as a connection response (Step S136)

Herein, the CM 2 cannot accept connection of the CE because the CM 2 and the CE possess different coexistence profiles or for some reason even though the CM 2 and the CE possess the same coexistence profile. In this case, the CE transmits, to a CE 1, a proxy information service request so as to cause the CM 1 that manages a geographical region before change to provide an information service by proxy (Step S137). The request can include information regarding the CM 2 that is a new CM to be connected determined in Step S134.

When the CM 1 receives the proxy information service request from the CE, the CM 1 transmits an information service request to the CM 2 (Step S138).

When the CM 2 receives the information service request from the CM 1, the CM 2 transmits a response to the request to the CM 1 (Step S139)

The CM 1 that has received the above response from the CM 2 transmits a response to the proxy information service request to the CE (Step S140).

The CE (and the communication node that can integrally move with the CE) and the two CMs execute the operation illustrated in FIG. 12, and therefore, even in a case where the CE needs to change a connected CM because the communication node moves across a region, the CE can smoothly change the connected CM. Further, the CE (and the communication node that can integrally move with the CE) and the two CMs execute the operation illustrated in FIG. 12, and therefore, even in a case where a CM in charge of a destination region cannot accept connection of the CE because the CE and the CM possess different coexistence profiles or for some reason even though the CE and the CM possess the same coexistence profile, it is possible to receive an information service from a CM in charge of a region before movement.

2. CONCLUSION

As described above, according to the embodiment of the present disclosure, the CE stores not only information of a CM that is currently connected but also information of CMs that manage peripheral regions, and therefore it is possible to smoothly connect the CE to a CM in charge of a destination region even in a case where the CE moves across a region and continuously provide a coexistence service.

A computer program for causing a processor (e.g., a CPU, a DSP, etc.) provided in a device of the present specification to function as the device (i.e., a computer program for causing the processor to execute operations of the above-described device) can also be created. In addition, a recording medium in which the computer program is recorded may be provided. Moreover, a device that includes a memory storing the computer program and one or more processors that can execute the computer program may also be provided. In addition, a method including operations of constituent elements of the device is also included in the technology of the present disclosure.

Note that it is not necessary for the processing described in this specification with reference to the flowchart and the sequence diagram to be executed in the order shown. Some processing steps may be performed in parallel. Further, some of additional steps can be adopted, or some processing steps can be omitted.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)
A communication control device including:
a communication unit configured to transmit geographical location information of the own device or a communication node served by the own device to a communication control determination device that controls coexistence of a plurality of wireless systems; and
an acquisition unit configured to acquire, from the communication control determination device, information including information necessary for communication control for coexistence as information regarding another communication control determination device that manages a peripheral region of a geographical region managed by the communication control determination device.

(2)
The communication control device according to claim 1, further including
a control unit configured to recognize a change in the geographical location information of the own device or the communication node and select a communication control determination device to be connected by using the information acquired by the acquisition unit.

(3)
The communication control device according to claim 2, in which
in a case where the control unit determines that the communication node is not able to complete connection to the selected communication control determination device, the control unit transmits a proxy provision request for a coexistence service to a communication control determination device in a geographical region of the communication node before movement.

(4)
The communication control device according to claim 3, in which
in a case where the control unit determines that the communication node is able to complete connection to the communication control determination device selected again, the control unit transmits a notification of termination of the proxy provision request to the communication control determination device that has provided the coexistence service by proxy.

(5)
The communication control device according to claim 3, in which
in a case where the selected communication control determination device and the own device possess different coexistence profiles, the control unit determines that the communication node is not able to complete connection to the selected communication control determination device.

(6)
The communication control device according to claim 3, in which
in a case where connection to the selected communication control determination device is not established because of timeout, the control unit determines that the communication node is not able to complete connection to the selected communication control determination device.

(7)
A communication control determination device configured to control coexistence of a plurality of wireless systems, the communication control determination device including
a control unit configured to generate information including information necessary for communication control for coexistence as information regarding another communication control determination device that controls and determines usage of the wireless systems around a geographical region managed by the own device.

(8)
The communication control determination device according to claim 7, in which
the control unit generates information including an identifier capable of identifying a type of a providable coexistence service.

(9)
A method including:
transmitting geographical location information of the own device or a communication node served by the own device to a communication control determination device that controls coexistence of a plurality of wireless systems; and
acquiring, from the communication control determination device, information including information necessary for communication control for coexistence as information regarding another communication control determination device that manages a peripheral region of a geographical region managed by the communication control determination device.

(10)
A method that is executed by a communication control determination device configured to control coexistence of a plurality of wireless systems, the method including
generating information including information necessary for communication control for coexistence as information regarding another communication control determination device that controls and determines usage of the wireless systems around a geographical region managed by the own device.

(11)
A computer program causing a computer to execute
transmitting geographical location information of the own device or a communication node served by the own device to a communication control determination device that controls coexistence of a plurality of wireless systems, and
acquiring, from the communication control determination device, information including information necessary for communication control for coexistence as information regarding another communication control determination device that manages a peripheral region of a geographical region managed by the communication control determination device.

(12)
A computer program that is executed by a computer configured to control coexistence of a plurality of wireless systems, the computer program causing the computer to execute
generating information including information necessary for communication control for coexistence as information regarding another communication control determination device that controls and determines usage of the wireless systems around a geographical region managed by the own device.

REFERENCE SIGNS LIST

100, 200, 300 device

The invention claimed is:
1. A communication control device comprising:
communication circuitry configured to transmit geographical location information of an-own device or a communication node served by the own device to a communication control determination device that controls coexistence of a plurality of wireless systems;

acquisition circuitry configured to acquire, from the communication control determination device, information including information necessary for communication control for coexistence as information regarding another communication control determination device that manages a peripheral region of a geographical region managed by the communication control determination device; and control circuitry that is configured to recognize a change in the geographical location information of the own device to a geographical region managed by the another communication control determination device, and subsequently select a communication control determination device to be connected by using the information acquired by the acquisition circuitry, wherein in response to the communication control determination device having a same coexistence profile as the own device and a different coexistence profile than the another communication control determination device, the control circuitry selects the communication control determination device as a proxy for the another communication control determination device, and a subsequent change in the geographical location information of the own device to another geographical location managed by a third communication control determination device with the same coexistence profile as the own device causes the control circuitry to select the third communication control determination device as the communication control determination device.

2. The communication control device according to claim 1, wherein in a case where the control circuitry determines that the communication node is not able to complete connection to the selected communication control determination device, the control circuitry transmits a proxy provision request for a coexistence service to a communication control determination device in a geographical region of the communication node before movement.

3. The communication control device according to claim 2, wherein
in a case where the control circuitry determines that the communication node is able to complete connection to the communication control determination device selected again, the control circuitry transmits a notification of termination of the proxy provision request to the communication control determination device that has provided the coexistence service by proxy.

4. The communication control device according to claim 2, wherein
in a case where connection to the selected communication control determination device is not established because of timeout, the control circuitry determines that the communication node is not able to complete connection to the selected communication control determination device.

5. A communication control determination device configured to control coexistence of a plurality of wireless systems, the communication control determination device comprising
a control circuitry configured to generate information including information necessary for communication control for coexistence as information regarding another communication control determination device that controls and determines usage of the wireless systems around a geographical region managed by an-own device, wherein the control circuitry is configured to
generate information including an identifier capable of identifying a type of a providable coexistence service, recognize a change in the geographical location information of the own device to a geographical region managed by the another communication control determination device, and subsequently select a communication control determination device to be connected by using the information acquired by acquisition circuitry, and in response to the communication control determination device having a same coexistence profile as the own device and a different coexistence profile than the another communication control determination device, the control circuitry selects the communication control determination device as a proxy for the another communication control determination device, and a subsequent change in the geographical location information of the own device to another geographical location managed by a third communication control determination device with the same coexistence profile as the own device causes the control circuitry to select the third communication control determination device as the communication control determination device.

6. A method comprising:
transmitting geographical location information of the own device or a communication node served by the own device to a communication control determination device that controls coexistence of a plurality of wireless systems;

acquiring with acquisition circuitry, from the communication control determination device, information including information necessary for communication control for coexistence as information regarding another communication control determination device that manages a peripheral region of a geographical region managed by the communication control determination device; and recognizing with control circuitry a change in the geographical location information of the own device to a geographical region managed by the another communication control determination device, and subsequently selecting a communication control determination device to be connected by using the information acquired by the acquisition circuitry, wherein in response to the communication control determination device having a same coexistence profile as the own device and a different coexistence profile than the another communication control determination device, selecting the communication control determination device as a proxy for the another communication control determination device, and a subsequent change in the geographical location information of the own device to another geographical location managed by a third communication control determination device with the same coexistence profile as the own device causing selecting of the third communication control determination device as the communication control determination device.

7. A non-transitory computer readable storage medium having instructions stored therein, that when executed by processing circuitry cause the processing circuitry to perform a process, the process comprising transmitting geographical location information of an own device or a communication node served by the own device to a communication control determination device that controls coexistence of a plurality of wireless systems, acquiring, with acquisition circuitry, from the communication control determination device, information including information necessary for communication control for coexistence as information regarding another communication control determination device that manages a peripheral region of a geographical region managed by the communication control determination device, and recognizing with control circuitry a change in the geographical location information of the own device to a geographical region managed by the another communication control determination device, and subsequently selecting a communication control determination device to be connected by using the information acquired by the acquisition circuitry, wherein in response to the communication control determination device having a same coexistence profile as the own device and a different coexistence profile than the another communication control determination device, selecting the communication control determination device as a proxy for the another communication control determination device, and a subsequent change in the geographical location information of the own device to another geographical location managed by a third communication control determination device with the same coexistence profile as the own device causing selecting of the third communication control determination device as the communication control determination device.

* * * * *